United States Patent [19]

McMillan

[11] 4,366,939
[45] * Jan. 4, 1983

[54] WIRE HOLDER SYSTEM AND METHOD OF POSITIONING AND MAINTAINING A BUNDLE OF WIRES

[76] Inventor: Ronald R. McMillan, 3318 W. 30th Ave., Anchorage, Ak. 99503

[*] Notice: The portion of the term of this patent subsequent to May 19, 1998, has been disclaimed.

[21] Appl. No.: 256,987

[22] Filed: Apr. 24, 1981

Related U.S. Application Data

[63] Continuation-in-part of Ser. No. 82,608, Oct. 9, 1979, Pat. No. 4,267,995.

[51] Int. Cl.³ .............................................. F16L 3/22
[52] U.S. Cl. .................................... 248/68 R; 248/49
[58] Field of Search ............ 248/68 R, 56, 49, 68 CB, 248/74 R, 74 A

[56] References Cited

U.S. PATENT DOCUMENTS

| | | | |
|---|---|---|---|
| 1,764,629 | 6/1930 | Houts et al. | 248/49 |
| 2,683,578 | 7/1954 | Rainey | 248/68 R |
| 3,135,535 | 6/1964 | Shepard | 248/50 |
| 4,267,995 | 5/1981 | McMillan | 248/74 R |

FOREIGN PATENT DOCUMENTS

| | | | |
|---|---|---|---|
| 1030906 | 5/1958 | Fed. Rep. of Germany | 248/68 R |
| 2524113 | 12/1976 | Fed. Rep. of Germany | 248/56 |
| 2280013 | 2/1976 | France | 248/68 CB |
| 768339 | 2/1957 | United Kingdom | 248/68 CB |
| 807721 | 1/1959 | United Kingdom | 248/68 R |

Primary Examiner—J. Franklin Foss
Attorney, Agent, or Firm—John H. Widdowson

[57] ABSTRACT

A wire holder system and method of positioning and maintaining a bundle of wires. The wire holding system comprises a first wire holder for elastically holding a bundle of wires having a generally circular shape; a second wire holder which disperses the individual wires in the wire bundle and maintains the generally circular shape of the wire bundle; and a third wire holder for layering and spacing the dispersed wires exiting the second wire holder. The method of positioning and maintaining a bundle of wires includes passing the bundle through an elastic zone of the first wire holer; dispersing the individual wires in the bundle by passing them through the second wire holder; and layering and spacing the dispersed wires from the second wire holder by passing the dispersed wires through the third wire holder.

12 Claims, 6 Drawing Figures

U.S. Patent  Jan. 4, 1983  Sheet 2 of 2  4,366,939
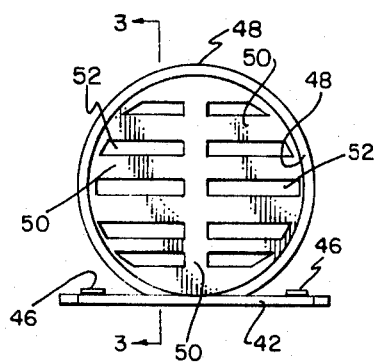
FIG. 2
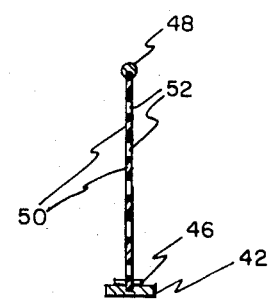
FIG. 3
FIG. 4
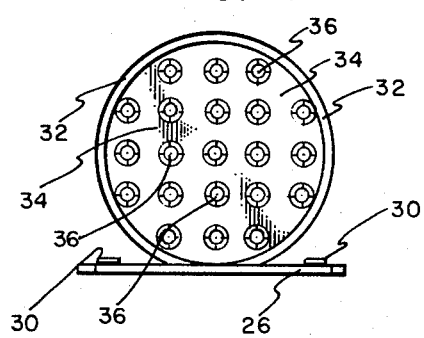
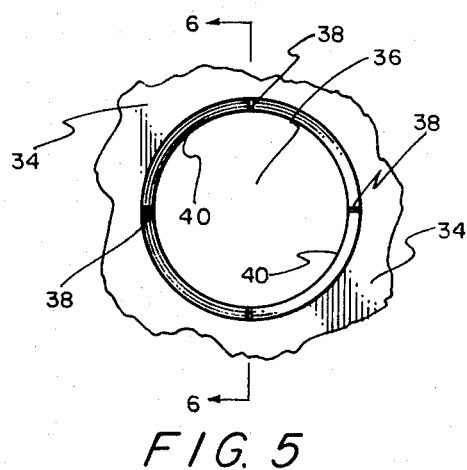
FIG. 5
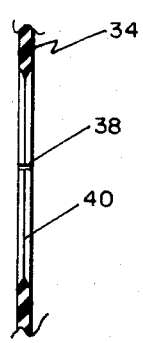
FIG. 6

WIRE HOLDER SYSTEM AND METHOD OF POSITIONING AND MAINTAINING A BUNDLE OF WIRES

This is a continuation-in-part application of my co-pending application Ser. No. 082,608, filed Oct. 9, 1979 now U.S. Pat. No. 4,267,995, whose prosecution has been closed and is in the process of issuing into a patent, which patent will be incorporated by reference into this application for disclosure purposes.

BACKGROUND OF THE INVENTION

1. Field of the Invention

This invention relates to a wire holding system. More specifically, this invention provides a wire holding system and a method of positioning and maintaining a bundle of wires.

2. Description of the Prior Art

U.S. Pat. No. 2,683,578 by Rainey discloses a rock formed of elastomeric material. U.S. Pat. No. 3,135,535 by Shepard illustrates a closure or boot having a plurality of openings for the passage of electrical wires. U.S. Pat. No. 2,382,970 by Borcherdt discloses a holder for cables that extend through an aperture in a bulkhead. U.S. Pat. No. 3,995,795 by Hogan illustrates a support for a plurality of wires that has a sawtooth configuration. None of these patents teach or suggest the wire holder system and method of this invention.

SUMMARY OF THE INVENTION

It is therefore an object of this invention to provide a wire holding system.

It is another object of this invention to provide a method of positioning and maintaining a bundle of wires.

Still other objects will be apparent to those skilled in the art from the following description of this invention.

The foregoing objects are achieved according to the practice of this invention. Broadly, this invention comprises a wire holder system and method of positioning and maintaining a bundle of wires. The wire holding system comprises a first wire holding means for elastically holding a bundle of wires having a generally circular shape; a second wire holder means which disperses the individual wires in the wire bundle while maintaining the generally circular shape of the wire bundle; and a third wire holder means for layering and spacing dispersed wires exiting the second wire holder means. The method of positioning and maintaining a bundle of wires includes passing the bundle through an elastic zone of the first wire holder means; dispersing the individual wires in the bundle by passing them through the second wire holder means; and layering and spacing the dispersed wires from the second wire holder means by passing the dispersed wires through the third wire holder means.

The advantages and objects of the invention will become evident from the following detailed description when read in conjunction with the accompanying drawings which illustrate the preferred embodiments of the invention:

BRIEF DESCRIPTION OF THE DRAWINGS

FIG. 2 is a front elevational view of the third wire holder which layers and spaces the dispersed wires from the wire bundle as the bundle leaves the second wire holder means;

FIG. 3 is a vertical sectional view taken in direction of the arrows and along the plane of line 3—3 in FIG. 2;

FIG. 4 is a front elevational view of the second wire holder means which separates or disperses the wires from the wire bundle as the bundle exits the first wire holder means;

FIG. 5 is an exploded view of a circular aperture of the center member of the second wire holder means; and FIG. 6 is a vertical sectional view taken in direction of the arrows and along the plane of line 6—6 in FIG. 5.

DETAILED DESCRIPTION OF THE INVENTION

Figure 1:
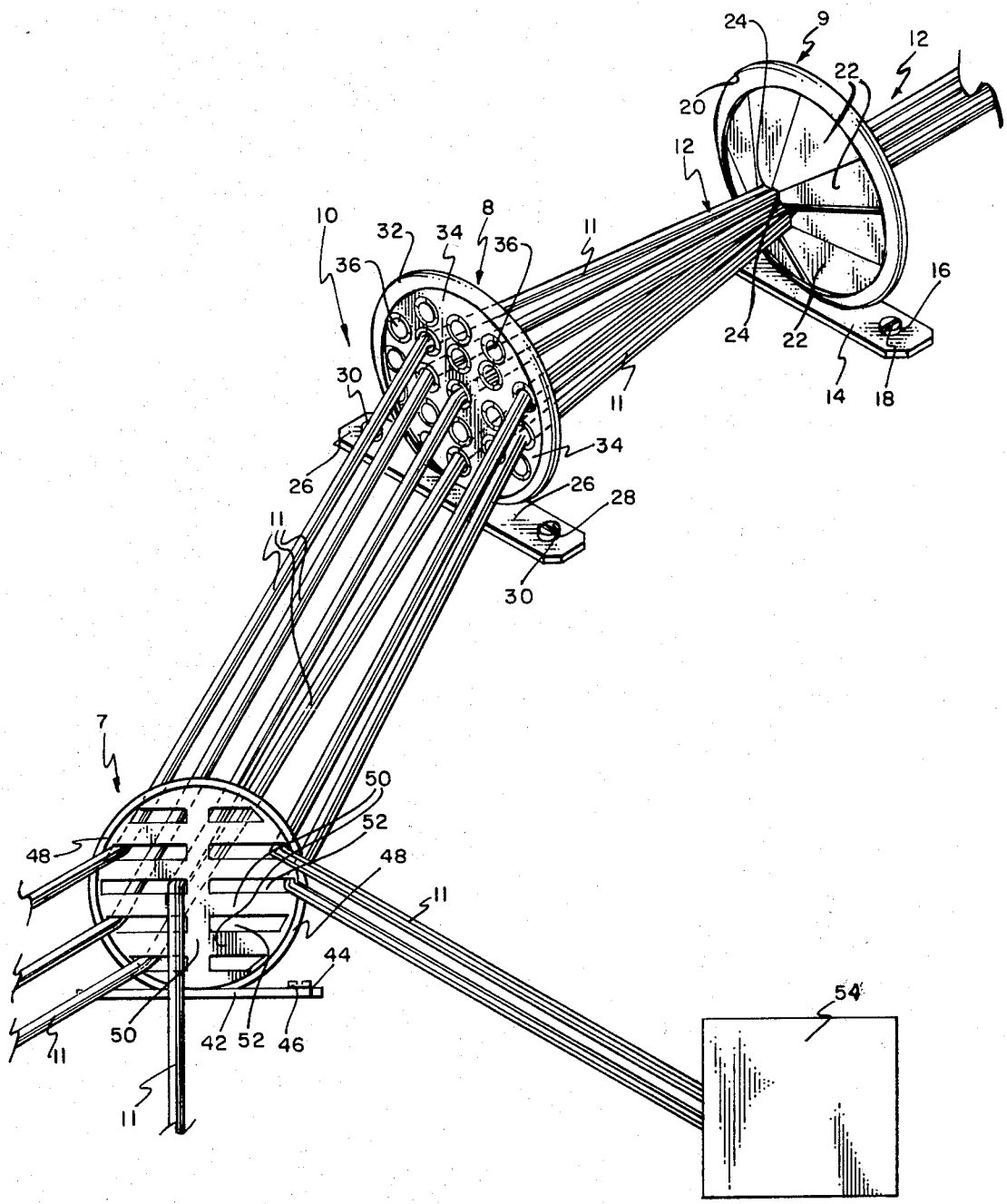
FIG. 1 is a perspective view of the wire holder system.

Referring in detail now to the drawings, wherein like reference numerals designate similar parts throughout the various views, and incorporating by reference the disclosure in my co-pending application (Ser. No. 082,608; filed Oct. 9, 1979) which has been allowed and will issue into a U.S. patent, there is seen a wire holder system, generally illustrated as 10, for holding a wire bundle 12 with individual wires 11 and having a first wire holder means, generally illustrated as 9; a second wire holder means, generally illustrated as 8; and a third wire holder means, generally illustrated as 7. First wire holder means 9 has a base 14 with apertures 16 for receiving fasteners 18. A rim 20 is integrally bound to the base 14. A plurality of overlapping triangular shaped members 22 are mounted in the rim 20 such as to have members 22 radially disposed thereto. The members 22 have an apex 24 and are constructed of any material (preferably plastic) such as to be elastic. In a closed position the members 22 define a plane. When the bundle 12 is fed between members 22 and through the holder 9, the members 22 overlappingly flare unidirectionally and the elasticity of each member 22 is of such a predetermined magnitude (depending on the weight of bundle 12) such as to bias the members 22 toward the closed position in order to firmly hold the bundle 12. In the closed position, the apices 24 of the members 22 meet in the center of the rim 20 to define an aperture.

The second wire holder means 8 separates or disperses the individual wires 11 from the bundle 12 while maintaining the generally circular shape of the wire bundle 12 in addition to providing tightness and neatness of the dispsersed wires 11 of the bundle 12 when the same makes a turn from a normal straight path (see FIG. 1). Holder 8 comprises a base 26 with apertures 28 for receiving fasteners 30. A rim 32 is integrally bound to the base 26. A center member 34 is mounted in rim 32 and includes circular apertures 36 for receiving individual wires 11 to separate them from the bundle 12. Circular apertures 36 have slits 38 around the periphery 40 thereof (see FIG. 5) to provide for adaptability to different individual wire 11 sizes. The periphery 40 of each circular aperture 36 is also tapered (see FIG. 6) for adaptability.

Holder 7 includes a base 42 with aperture 44 for receiving fasteners 46. A rim 48 is integrally bound to the base 42. A center member 50 is mounted in rim 48 and has a structure defining a plurality of elongated slots 52 which also have a periphery that is tapered to provide for adaptability to different individual wire 11 sizes. Holder 7 provides for layering and spacing the individual dispersed or separated wires 11 which exit the holder 8 in order that the desired individual wires 11 can be neatly extracted to run to components 54 (see FIG. 1).

With continuing reference to the drawings for operation of the invention and the method of positioning and maintaining the bundle 12 of wires 11, the bundle 12 having a generally circular shape is passed through an elastic zone of the wire holder means 9. The elastic zone is defined as the plurality of overlapping generally triangular shaped elastic members 22 having a base and an apex. The base of each elastic member 22 is mounted in rim 20 to have the members 22 radially disposed with respect to the rim 20. The elasticity of each member 22 when holding the bundle 12 biases the elastic member 22 toward the closed position (wherein the members 22 define a plane) for elastically firmly gripping and holding the wires 11 in said bundle in a generally circular position. After the bundle 12 passes through the elastic zone, the individual wires 11 in the bundle 12 are separated and dispersed (while being essentially maintained in a generally circular shape) by inserting each individual wire 11 through an aperture 36 of the center member 34 of the holder 8. Subsequently, the exiting individual wires 11 from the holder 8 may be deviated from the normal straight path by bending the dispersed wires 11; the holder 8 maintains the individual wires 11 in a tight and neat position while being bent towards the layering and spacing holder 7. Layering and spacing the bent, dispersed individual wires 11 leaving the aperture 36 of holder 8 is accomplished by passing each individual wire 11 through each elongated slots 52 of the plurality of same within the center member 50 of the holder 7; it should be noted that more than one individual wire 11 may be inserted through each slot 52. Layering and spacing of the individual dispersed wires 11 is desirable so that the desired individual wires 11 can be neatly extracted to run to component 54.

While the present invention has been described herein with reference to particular embodiments thereof, a latitude of modifications, various changes and substitutions are intended in the foregoing disclosure, and it will be appreciated that in some instances some features of the invention will be employed without a corresponding use of other features without departing from the scope of the invention as set forth.

I claim:

1. A wire holding system comprising in combination a first wire holder means for holding a bundle of wires having a generally circular shape; and a second wire holder means which disperses the individual wires in the wire bundle and maintains the generally circular shape of the wire bundle in addition to providing tightness and neatness of the dispersed wire bundles when the same makes a turn from a normal straight path; said first wire holder means including a first base; a first rim integrally bound to said first base; a plurality of overlapping generally triangular shaped elastic members, each elastic member having a base and an apex, said base of each elastic member being mounted in said first rim to have said members radially disposed with respect to said first rim, said elastic members in a closed position essentially define a plane and unidirectionally flaring when receiving and holding said bundle, said elasticity of each member when holding said bundle bias said members toward said closed position for firmly gripping, holding, and restraining said bundle.

2. The wire holding system of claim 1 wherein said second wire holder means comprises a second base; a second rim integrally bound to said second base; a second wire holder center member mounted in said second rim and includes a structure defining a plurality of openings.

3. The wire holding system of claim 2 wherein said openings are circular apertures.

4. The wire holding system of claim 2 wherein said openings are elongated slots.

5. The wire holding system of claim 3 additionally comprising a third wire holder means to provide layers and spaces between the dispersed wires in the wire bundle exiting the second wire holder means in order that the desired individual wires can be neatly extracted to run to the components.

6. The wire holding system of claim 5 wherein said third wire holder means comprises a third base; a third rim integrally bound to said third base; a third wire holder center member mounted in said third rim and including a structure defining a plurality of elongated slotted openings.

7. The wire holding system of claim 6 wherein said plurality of circular apertures include a plurality of slits along the periphery of each to provide for adaptability to different wire sizes.

8. The wire holding system of claim 7 wherein the periphery of each circular aperture additionally defines a rim tapered on both sides to also provide for adaptability.

9. The wire holding system of claim 8 wherein said elongated slotted openings each also include a rim tapered on both sides for providing adaptability to different wire sizes.

10. The wire holding system of claim 9 additionally including said apices of said elastic members in the closed position meeting to define an aperture centrically positioned with respect to said first rim.

11. The wire holding system of claim 10 wherein said first base, said second base, and said third base, each has a structure defining a plurality of apertures.

12. A method of positioning and maintaining a bundle of wires comprising the steps of: passing the bundle of wires having a generally circular shape through an elastic zone of a first wire holder means having a first base and a first rim integrally bound to said first base, said elastic zone being defined as a plurality of overlapping generally triangular shaped elastic members, each plastic member having a base and an apex, said base of each elastic member being mounted in said first rim to have said members radially disposed with respect to said first rim; said elastic members in a closed position essentially defining a plane and unidirectionally flaring when receiving and holding said bundle, said elasticity of each member when holding said bundles biases said elastic members toward said closed position for firmly gripping and holding the wires in said bundle; dispersing the individual wires in the wire bundle simultaneously to maintaining the generally circular shape of the wire bundle by inserting each individual wire of said bundle of wire through each aperture of a plurality of apertures of a second wire holder center member mounted in a second rim attached to a secnd base of a second wire holder means; and subsequently dispersing again the individual wires from the group of wires which is circular in shape by inserting each individual wire through elongated slot opening of a plurality of elongated slots of a third wire holding center member mounted in a third rim attached to a third base of a third wire holder means.

* * * * *